A. C. ROEBUCK.
SHUTTER MECHANISM.
APPLICATION FILED JAN. 30, 1908.

909,677.  Patented Jan. 12, 1909.

3 SHEETS—SHEET 1.

Attest:
Geo. M. Graham.
Henry Moe.

Inventor:
Alvah C. Roebuck,
by Robert Burns, Atty.

A. C. ROEBUCK.
SHUTTER MECHANISM.
APPLICATION FILED JAN. 30, 1908.
909,677.
Patented Jan. 12, 1909.
3 SHEETS—SHEET 2.
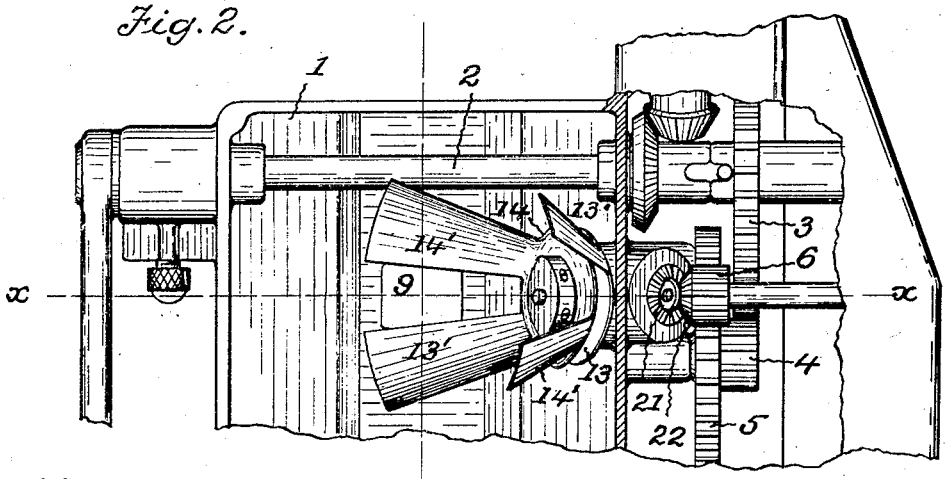
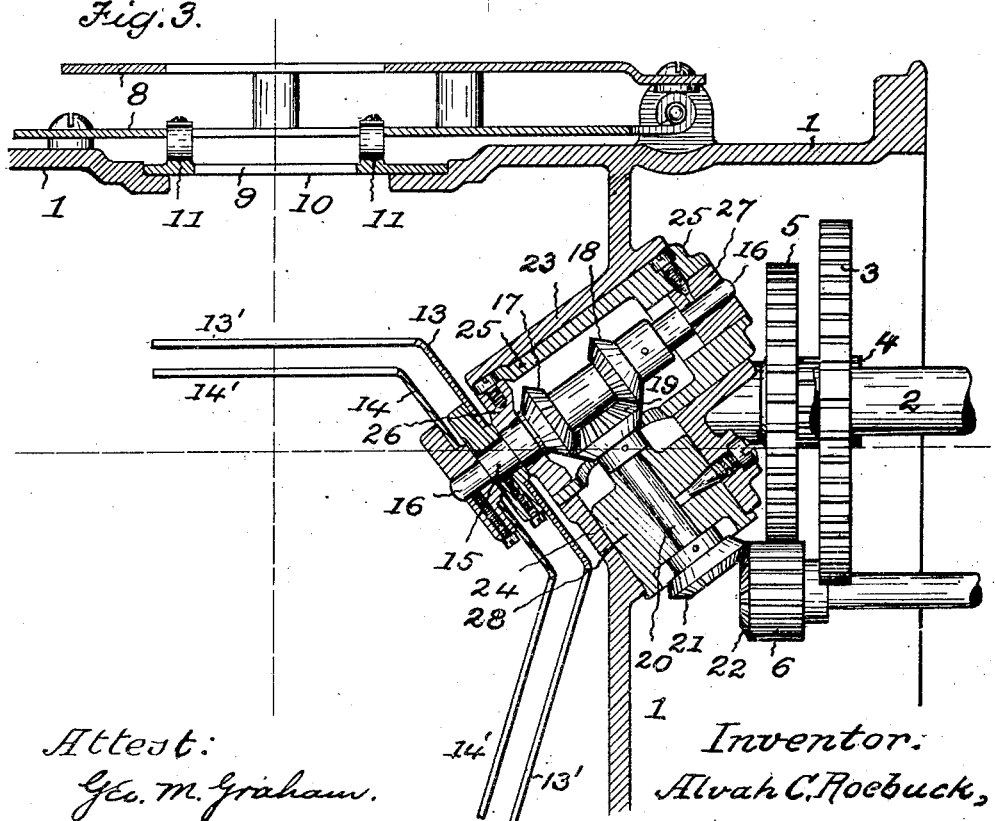

A. C. ROEBUCK.
SHUTTER MECHANISM.
APPLICATION FILED JAN. 30, 1908.

909,677.

Patented Jan. 12, 1909.

3 SHEETS—SHEET 3.

Attest:
Geo. M. Graham
Henry Moe

Inventor:
Alvah C. Roebuck,
by Robert Burns
Atty.

UNITED STATES PATENT OFFICE.

ALVAH C. ROEBUCK, OF CHICAGO, ILLINOIS.

SHUTTER MECHANISM.

No. 909,677.    Specification of Letters Patent.    Patented Jan. 12, 1909.

Application filed January 30, 1908. Serial No. 413,346.

*To all whom it may concern:*

Be it known that I, ALVAH C. ROEBUCK, a citizen of the United States of America, and a resident of Chicago, in the county of Cook and State of Illinois, have invented certain new and useful Improvements in Shutter Mechanisms, of which the following is a specification.

This invention relates to the light controlling shutter mechanism used in the intermittent feed type of kinetoscopes, and has for its object to provide a simple and efficient structural formation and arrangement of the shutter parts whereby a very extended path for the shutter blades within a prescribed space in the kinetoscope housing is attained, with the results of a corresponding decrease in the period of non-exposure, increased brilliancy in the pictures projected, and a material reduction in the flicker incident to the ordinary form of shutter blades; and with which the opening and closing of the light aperture is effected across its narrowest width, and the shutter travel in such opening and closing movements is cut to nearly one-third of that of an ordinary single shutter blade which travels diagonally across the light aperture, all as will hereinafter more fully appear.

Figure 1:
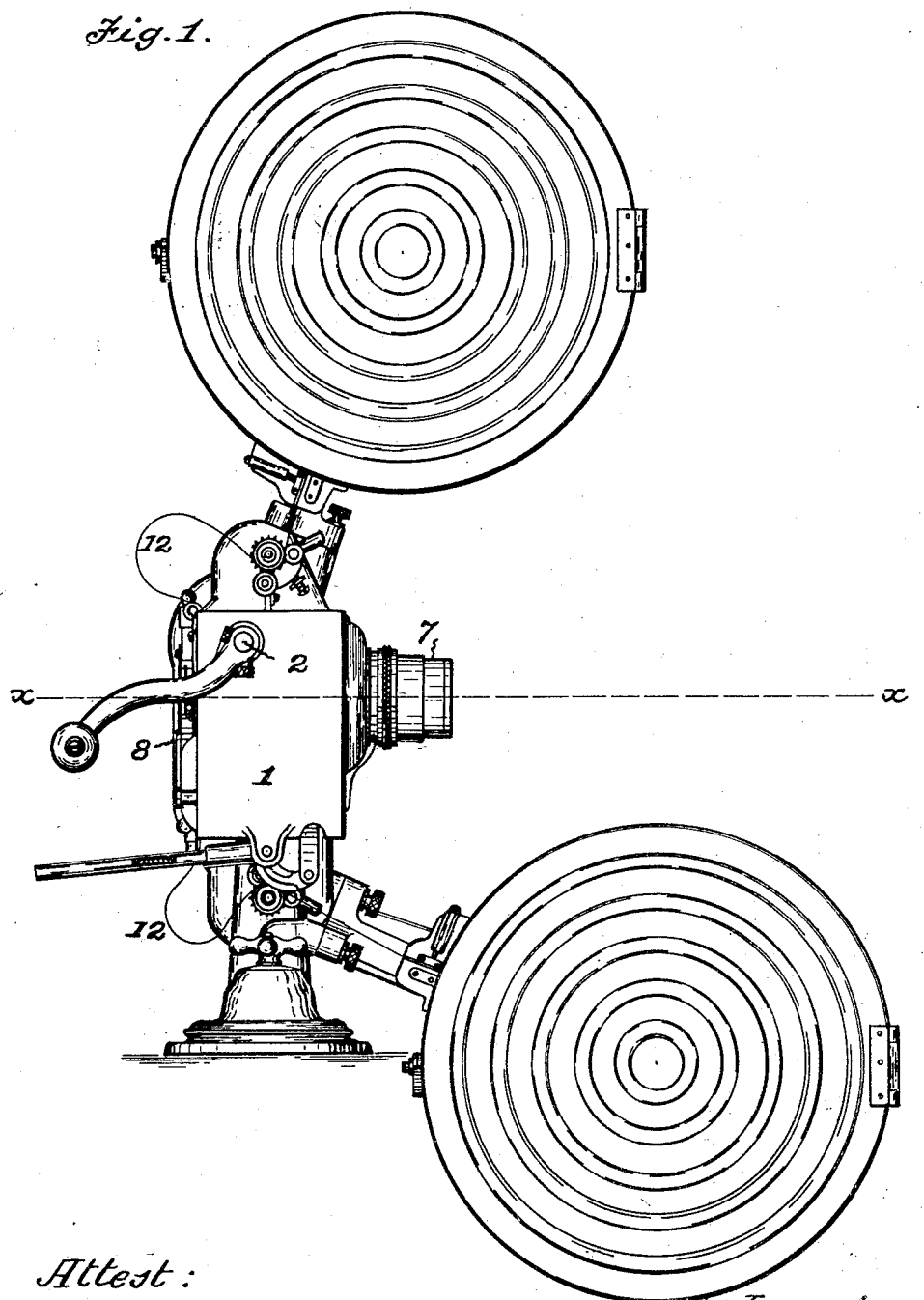
Figure 4:
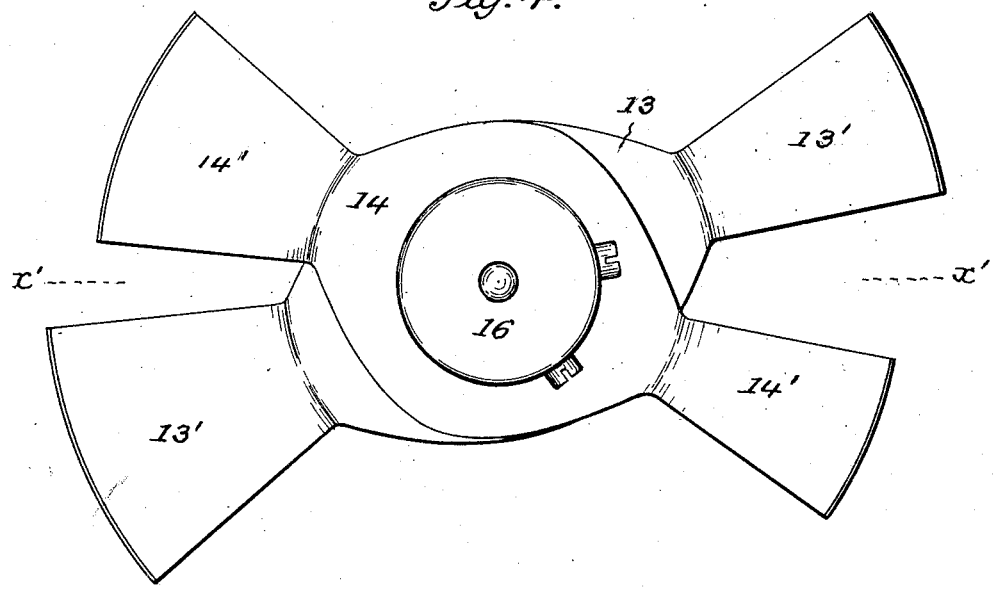
Figure 5:
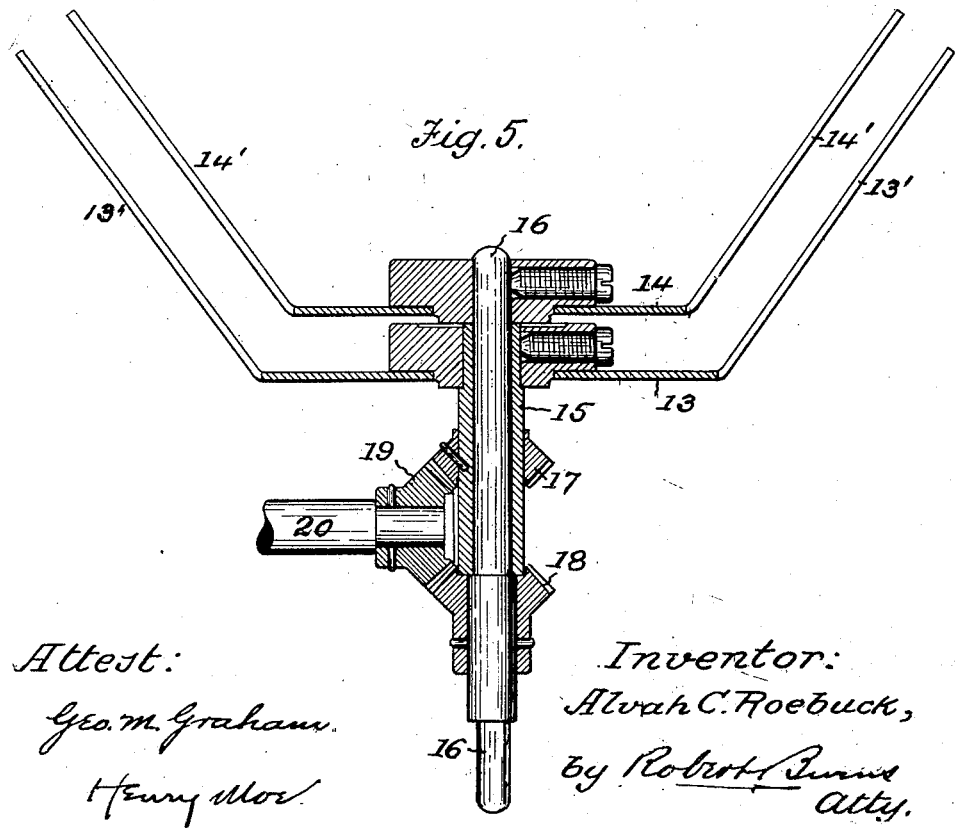

In the accompanying drawings illustrative of the present invention: Figure 1, is a general side elevation of the kinetoscope. Fig. 2, is a detail front elevation, with parts of the housing in section. Fig. 3 is a detail horizontal section on line $x$—$x$, Figs. 1 and 2. Fig. 4 is a detail elevation of the shutter. Fig. 5, is a detail section of same on line $x'$—$x'$ Fig. 4.

Similar numerals of reference indicate like parts in the several views.

Referring to the drawings, 1 represents the supporting frame or housing of the kinetoscope, preferably of the closed form shown, and in which is arranged the film feeding and light controlling mechanisms for the kinetoscope, and such film feeding mechanism being of any suitable form but preferably of the construction shown in my application for Letters Patent Serial Number 425,094 filed April 4, 1908.

2, is the main operating shaft of the kinetoscope suported transversely in bearings in the housing 1, and having operative engagement through intermediate gears 3, 4, 5 and 6, with the carrying shafts of the twin or duplex light controlling shutter, and through other intermediate gears with the film feeding, and other usual mechanisms of the kinetoscope, in order that such different mechanisms may operate in unison.

7, is the projecting lens or objective at the front end of the kinetoscope housing, and 8 is a horizontally swinging gate at the rear end of said housing for confining the pictured film in its vertical travel past a light passage 9 in the rear wall of the housing 1, such light passage has a symmetrical arrangement with relation to the focal axis of the apparatus, and said focal axis is indicated by the dotted line on Fig. 1.

10, is a vertical diaphragm arranged in a containing recess formed therefor in the rear wall of the housing 1. Such diaphragm is formed with the light passage 9 aforesaid, and with vertical ribs or slideways 11 at the sides of such passage and upon which the film 12 slides in its vertical travel through the apparatus.

In the present construction the twin or duplex light controlling shutter, before referred to consists of two bladed members 13 and 14 having rotation in opposite directions around a common axis and with their blades adapted to intermittently screen the light opening 9 of the kinetoscope, as usual in the present type of duplex shutters, and with the usual object that the shutter opens and closes from top to bottom at the same time and thus avoid the loss of any more light than is necessary in the closing of the light aperture preparatory to the movement of the film, and the opening of the light aperture after the movement of the film, it being obvious that any reduction in the period of darkness or non-exposure reduces the amount of flicker in the picture in like proportion. In the present improvement said shutter members are of the truncated cone form shown more especially in Figs. 3 and 5, with the blades 13' and 14' forming the cone portions of said members, and the central attaching webs or hubs the truncated portions of said members. And in connection therewith the arrangement of the axis of rotation of said shutter members in a horizontal plane and in a direction oblique to the focal axis of the apparatus, and so that the shutter blades as they move past the light opening 9, will have movement in a plane parallel to said opening. With such arrangement of parts the shutter blades have movement in a very extended path while at the same time a very compact arrangement of the shutter parts is attained within the kinetoscope housing.

15, is a tubular shaft carrying the shutter member 13, and journaled in the main housing 1 as hereinafter set forth.

16, is a central shaft carrying the shutter member 14; such shaft is arranged in the bore of the tubular shaft 15 and also journaled in the main housing.

17 and 18 are bevel gears carried by the respective shafts 15 and 16 aforesaid.

19 is a bevel gear meshing with and driving the aforesaid bevel gears 17 and 18, and their respective shutter carrying shafts 15 and 16 in opposite directions.

20, is an intermediate shaft carrying the bevel gear 19 at one end, and at the other end a second bevel gear 21 which meshes with and is driven by a bevel gear 22 attached to the gear wheel 6 of the before described train of driving gears.

23 and 24 are sleeves integrally formed with a side wall of the main housing 1, and in right angle relation to each other; such sleeves have circular bores with their axis on a horizontal plane, and with the axis of the bore of the sleeve 23 in the oblique position in relation to the focal axis of the apparatus, as heretofore described.

25 is a journal bushing fitting the sleeve 23 aforesaid, and having removable end heads 26 and 27 forming the journal bearings for the respective shutter carrying shafts 15 and 16, as more particularly shown in Fig. 3.

28 is a removable journal bushing fitting the sleeve 24 aforesaid, and forming the journal bearing for the intermediate shaft 20 aforesaid.

The bushings and heads just described are held in place by set screws or other usual fastening means, and as so arranged, a ready dismemberment of the parts for repairs, and the like, can be conveniently effected.

Having thus fully described my said invention what I claim as new and desire to secure by Letters Patent, is:—

1. In a kinetoscope, the combination of a main frame or housing having a light passage, a shutter controlling said light passage and having a truncated cone form with blades forming the cone portion of the shutter, the axis of rotation of the shutter being in a plane oblique to the focal axis of the light passage aforesaid, and means for imparting rotation to the shutter, substantially as set forth.

2. In a kinetoscope, the combination of a main frame or housing having a light passage, a shutter controlling said light passage and having a truncated cone form with blades forming the cone portion of the shutter, the axis of rotation of the shutter being on a horizontal plane and oblique to the focal axis of the light passage aforesaid, and means for imparting rotation to the shutter, substantially as set forth.

3. In a kinetoscope, the combination of a main frame or housing having a light passage, a shutter controlling said light passage and comprising a pair of shutter members having their axis of rotation arranged oblique to the focal axis of the light passage and blades arranged in conical relation to said axis of rotation, and means for imparting rotation to such shutter members in opposite directions, substantially as set forth.

4. In a kinetoscope, the combination of a main frame or housing having a light passage, a shutter controlling said light passage and comprising a pair of shutter members having their axis of rotation arranged on a horizontal plane and oblique to the focal axis of the light passage and blades arranged in conical relation to said axis of rotation, and means for imparting rotation to such shutter members in opposite directions, substantially as set forth.

5. In a kinetoscope, the combination of a main frame or housing having a light passage, a shutter controlling said light passage and comprising a pair of shutter members having their axis of rotation arranged oblique to the focal axis of the light passage and blades arranged in conical relation to said axis of rotation, and means for imparting rotation to such shutter members in opposite directions, the same comprising a hollow shaft carrying one shutter member, a central shaft carrying the other shutter member and passing through the hollow shaft, bevel gears secured to the respective shafts, a bevel gear meshing with said bevel gears and adapted to rotate the same in opposite directions, an intermediate shaft carrying said bevel gear, and means for imparting rotation to said intermediate shaft, substantially as set forth.

6. In a kinetoscope, the combination of a main frame or housing having a light passage, a shutter controlling said light passage and comprising a pair of shutter members having their axis of rotation arranged oblique to the focal axis of the light passage and blades arranged in conical relation to said axis of rotation, and means for imparting rotation to such shutter members in opposite directions, the same comprising a hollow shaft carrying one shutter member, a central shaft carrying the other shutter member and passing through the hollow shaft bevel gears secured to the respective shafts, a bevel gear meshing with said bevel gears and adapted to rotate the same in opposite directions, an intermediate shaft carrying said bevel gear, a main driving shaft, operative connections between the intermediate shaft aforesaid and the main driving shaft, and removable bushings fitting bores formed therefor in the main housing and providing bearings for the shutter carrying and intermediate shafts aforesaid, substantially as set forth.

Signed at Chicago, Illinois, this 27th day of January, 1908.

ALVAH C. ROEBUCK.

Witnesses:
E. J. WILLIAMS,
ROBERT BURNS.